Figure 1:
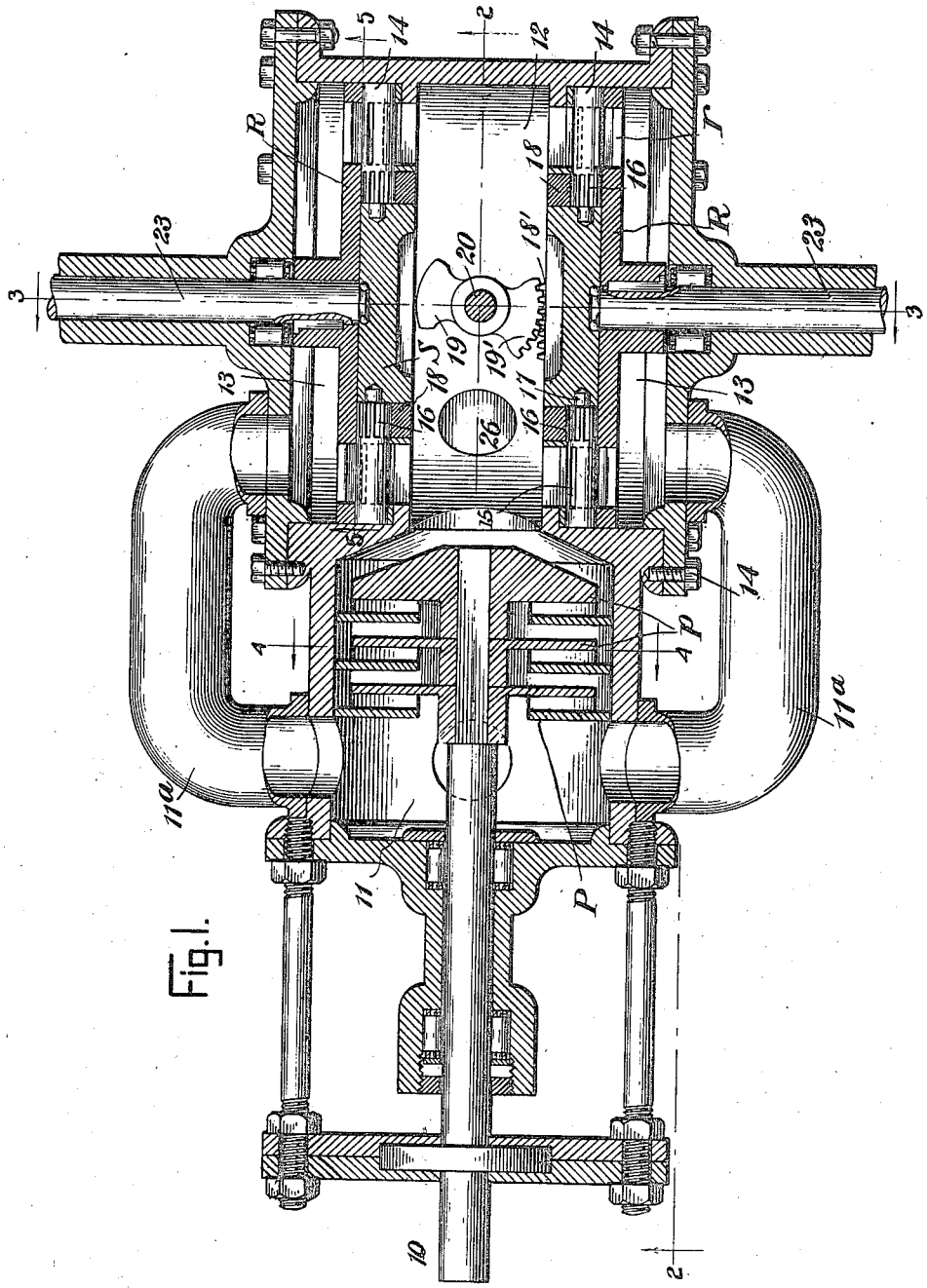

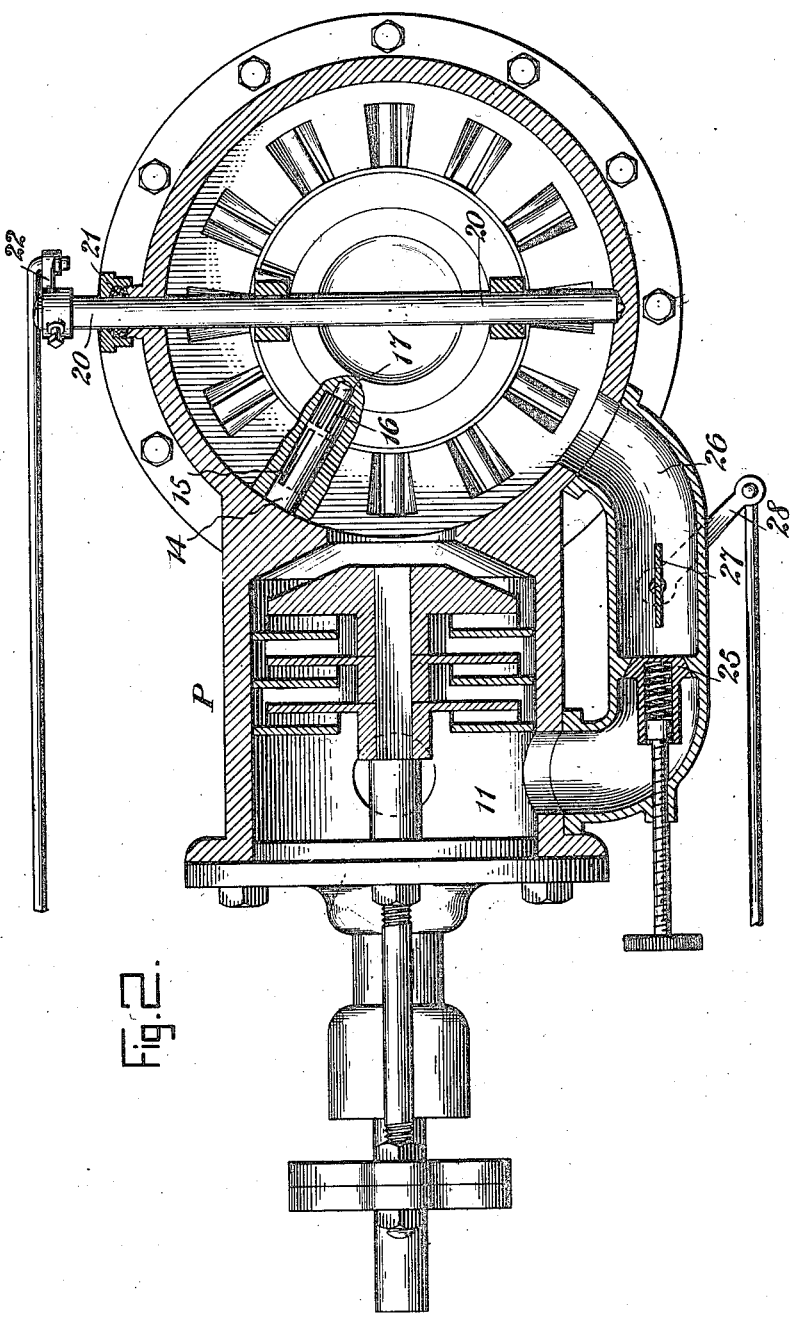

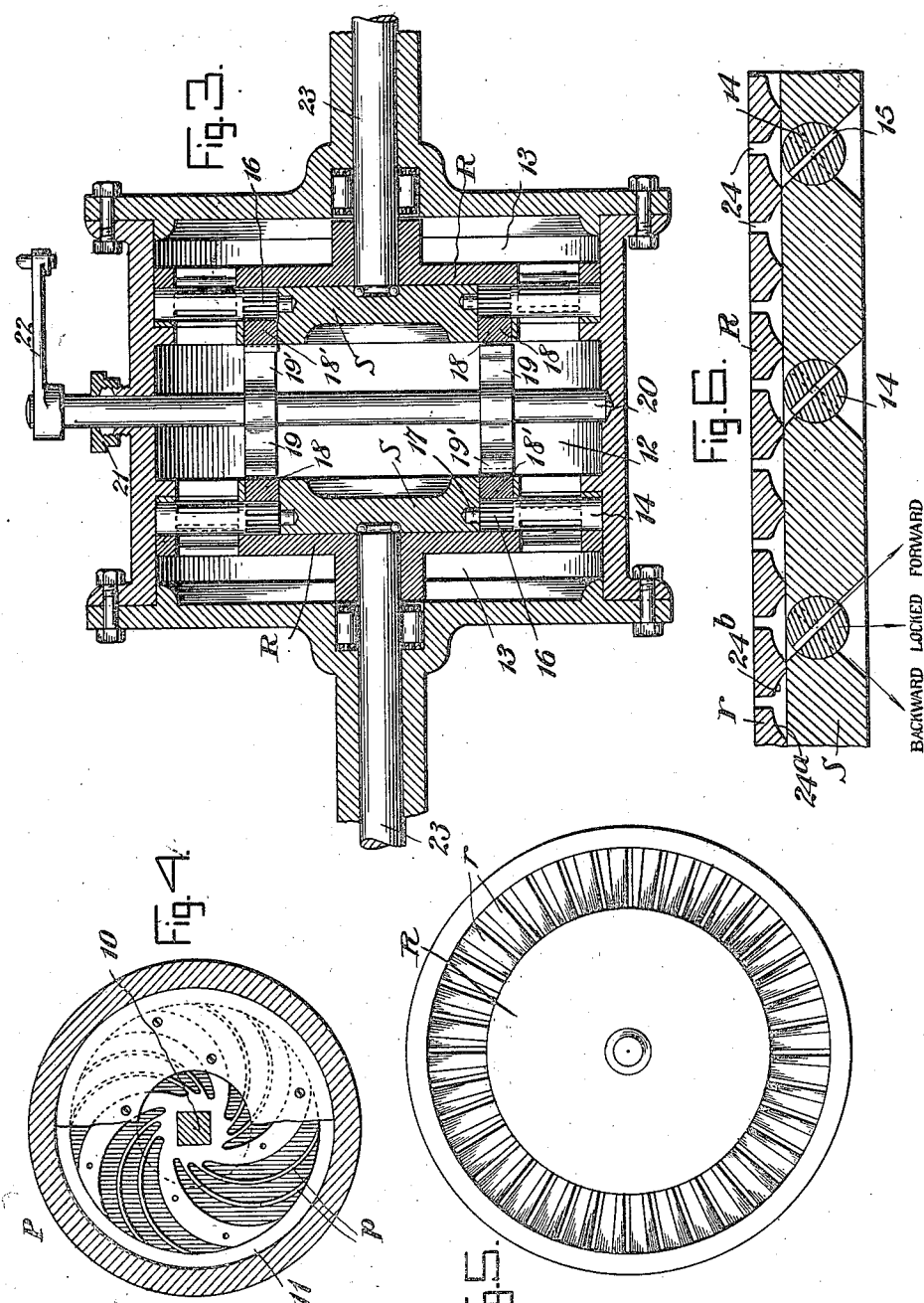

UNITED STATES PATENT OFFICE.

JACOB CLOOS, DECEASED, LATE OF MILWAUKEE, WISCONSIN, BY ARTHUR RICHARD BARRY, ADMINISTRATOR, OF MILWAUKEE, WISCONSIN, ASSIGNOR TO ROSA CLOOS AND THOMAS H. GILL, BOTH OF MILWAUKEE, WISCONSIN.

VARIABLE-SPEED FLUID TRANSMISSION FOR MOTOR-VEHICLES.

1,175,605.

Specification of Letters Patent.

Patented Mar. 14, 1916.

Application filed July 16, 1914. Serial No. 851,395.

*To all whom it may concern:*

Be it known that I, ARTHUR R. BARRY, a citizen of the United States, and a resident of Milwaukee, in the county of Milwaukee and State of Wisconsin, administrator of the estate of JACOB CLOOS, deceased, late a citizen of the United States and late a resident of Milwaukee, in the county of Milwaukee and State of Wisconsin, who in his lifetime did invent a new and Improved Variable-Speed Fluid Transmission for Motor-Vehicles, do hereby declare the following to be a full, clear, and exact description.

The invention relates specifically to improvements in variable speed fluid power transmissions pertaining to that class in which a fluid, preferably medium heavy mineral oil, is used as a medium to transmit power and regulate the speed of a motor vehicle or other machine in place of gears and clutches.

The object of the invention is not only to provide a more simple, safe and efficient device for transmitting power from the driving element to the driven element, but also to provide a device to eliminate the inherent disadvantages and difficulties incident upon the use of sliding spur gears, differential gears, planetary speed changers and complicated friction clutches, which are a constant source of repair and consequent high cost of maintenance.

A further object of the invention is to provide a gearless and clutchless power transmission in which the control of speed is so simplified that any person possessed of ordinary intelligence will be able to manipulate the machine with perfect safety. In other words, one purpose of the invention is to make the power transmission of a motor vehicle fool-proof.

In order to achieve efficient power transmission, four cardinal features are very essential: 1st. The power developed by the engine should be transmitted under absolute control to the rear axle or road wheels without any intricate mechanism. 2nd. The power transmitted to the rear wheels, while performing a steady drive in a straight line, must permit a difference of speed in the two drive wheels when turning, and must establish a rapid restoration to normal condition after the turn is completed. 3rd. All mechanism required for the power transmission must be permanently lubricated and protected by close and tight housing. 4th. On reaching the speed limit prescribed by law, an automatic device should prevent any further increase in speed, and at the same time the full power of the motor must be at the instant command of the driver in case of emergency. All these conditions have been met in a highly satisfactory manner by the invention of which the following is a full, clear and exact description, such as will enable persons who are skilled in the art to which it pertains to practice, make and use the same, reference being had to the accompanying drawings forming a part of this specification in which like characters of reference indicate corresponding parts in all the views, and in which—

Figure 1 is a horizontal longitudinal section illustrating a preferred embodiment of the invention; Fig. 2 is a vertical section on the line 2—2 of Fig. 1; Fig. 3 is a transverse vertical section on the line 3—3 of Fig. 1; Fig. 4 is a transverse section on the line 4—4 of Fig. 1; Fig. 5 is a face view of one of the rotors; and Fig. 6 is a development of a section of a rotor and adjacent stator, indicating the relation of the plug nozzles to these parts.

The several parts of the device may be made of any suitable materials, and the relative sizes and proportions, as well as the general design of the mechanism, may be varied to a considerable extent without departing from the spirit of the invention hereinafter more fully set forth and specifically claimed.

This power transmission consists of but three essential parts, the pressure pump or the power element P, the stator or stationary element S, and the rotor or rotating element R.

The pressure pump is of the multi-stage turbine type in which a number of disks or impellers $p$ are mounted directly upon the engine shaft 10, passing the working fluid from the suction chamber 11 through the impeller into the pressure chamber 12, impinging upon the buckets $r$ of the rotor and returning through one or more passageways 11$^a$ to the suction chamber.

The stator consists of the cast iron housing, the interior which conforms to the size of the impeller and the diameter of the rotors. The cylinder of the stator containing the rotors is divided into three sections, the pressure chamber and the two return or receiving chambers 13. The pressure chamber is separated from the return chambers by cast iron disks, hereafter called the stators, which are permanently secured to the housing, having a close-fit to prevent leakage around the cylinder.

Embedded around the periphery of the stators are a number of cylindrical plugs 14 of any suitable length, say about two inches for an ordinary vehicle transmission, provided with longitudinal slots or discharge nozzles 15. The plugs are closely ground and fitted into their seats and each has a pinion 16 and a pivot 17 at the inner end. Gear rings 18, in mesh with the pinions, inserted from the inside of the stators, furnish means to rotate the plugs in any direction. A small section 18' of the gear rings is bevel geared on the outside of the rings and in mesh with two rocker arms 19 secured to a vertical shaft 20. The rocker arms include bevel gear sections 19', one above and the other below the axis of the stators. It can readily be seen that by rotating the vertical shaft both gear rings 18 actuated by the rocker arms 19 must rotate in the same direction, consequently all plugs 14 rotate simultaneously and with the same angularity in relation to their openings or nozzles 15. The vertical shaft is extended outside the housing through a stuffing box 21 and provided with a lever 22 controlling the movements.

The rotor consists of two cast iron disks, each one keyed to the one half 23 of the rear shaft. Upon the surface of each rotor R are numerous openings or slots 24 corresponding with the nozzles of the plugs in the stator. On the sides of each opening 24 are curves 24ª and 24ᵇ molded into the casting, and these curves correspond to the buckets of a Pelton turbine wheel. The rotors revolve within the cylinder with a close fit against the face of the stator although they are not in mechanical contact with each other.

The working fluid by which the rotors are impelled is preferably a medium heavy mineral oil, which is practically incompressible, forming a positive link between the engine shaft 10 and the driven wheels. It has also the advantage of constant lubrication of all moving parts. The escape of oil or the influx of air into the stator is effectively prevented. The kinetic energy used is converted directly into rotation by impulse and reaction. Nozzles or guide vanes direct the impulse of the oil jet against rotating vanes or buckets, being in such form and position as to convert the greatest percentage of the inherent energy of the fluid into useful power on the driven wheels. The pressure upon the oil in the pressure chamber raised by the action of the circulating or pressure pump, varies with the amount of power required for certain speeds and may reach several hundred pounds per square inch under heavy service.

The power of the rotor does not depend on its diameter but upon the pressure and amount of oil applied to it through the size of nozzle used, which also determines the size and shape of the buckets which receive the impulse of the fluid jet at different angles. The diameter of the rotor determines its speed under a given pressure; consequently the number of turns at which the rotor turns or the speed of the vehicle is constant.

Speed variations may be obtained in two ways, each method being independent of the other, while both are capable of simultaneous action. 1st. With the engine running at constant speed, the speed of the vehicle may be varied from zero to full speed by changing the direction of the impulse oil jet against the buckets of the rotor from a straight line parallel with the axis of the rotor or by-pass to an angle of 45 degrees, when its speed is the greatest. Returning to the by-pass below the center line, the motion is reversed; thus, an infinite variety of speed changes can be made. 2nd. The speed of the vehicle may be changed by directing the impulse of the oil jet constantly against the vanes of the rotor and operating the fuel lever to regulate the quality of the explosive mixture passing to the engine cylinder.

Placing the speed lever on the center, the engine may be started and run at full speed causing a free circulation of the working fluid, at the same time, centering the exhaust openings 24 in the rotor directly in line with the impulse nozzles 15 of the stator, preventing the rotor from turning. Any attempt to rotate the rear axle will be opposed by the impulse of the oil jets against the curvatures 24ᵇ of the rotor holding the latter in a locked position serving as a brake to the rear road wheels; thus an absolute safety on grades is assured for all ordinary driving. This feature also dispenses with the necessity of a friction clutch with its endless troubles and repairs.

*Speed limit.*—This power transmission is provided with a speed limit controller consisting of an adjustable pop-safety valve 25 in a by-pass 26 between the pressure and the receiving chambers. This safety valve may be set at a pressure corresponding to a predetermined mileage or speed limit. With an increase of pressure the safety valve opens and by-passes the surplus pressure and working fluid, and prevents any consequent increase in speed or mileage. To overcome temporary power requirements, as climbing a steep hill, avoiding accidents or crowded streets, passing over sandy roads or any other emergency, a butterfly valve 27 controlled by a pedestal lever 28 is inserted at any desired place in the by-pass 26. By closing this valve the driver will have all the power inherent in the engine instantly at his command.

*Efficiency.*—The efficiency of this power transmission is naturally very high as it eliminates all losses due to bearings and gears. Between the engine shaft and the circulating pump is but one bearing and this is permanently lubricated. To start and stop the vehicle or change its speeds requires only a slight motion of the speed lever. The jars and shocks so common in starting and changing speeds in other gear transmission have been entirely eliminated by applying the power slowly but surely. This flexibility of power application will not only protect the passenger from severe shocks and vibration, but it also means a considerable reduction in the wear and tear of every part of the vehicle and motor.

*Permanence.*—There is nothing to wear out. The bearings are the only rubbing parts, but, being roller bearings, constantly flooded with oil, there is no chance to wear. The erosive action which accompanies the use of impulse jets has been reduced to a minimum by the use of oil, which causes the nozzles in the plugs and the curvature on the rotors to retain their original shape indefinitely. The combined weight of the pressure pump, the stator, the rotors and the oil is suspended from the rear axle adding to the adhesion of the drive wheels to the road.

Claims:

1. The herein described variable speed fluid transmission mechanism comprising a driving element, a driven element, a casing between the driving and driven elements, a receiving chamber at one end of the casing, a pressure chamber at the other end of the casing, means to cause circulation of fluid directly from the receiving chamber to the pressure chamber, a stator adjacent the pressure chamber, a rotor adjacent the stator, means to return the fluid from the rotor to the receiving chamber, and a series of rotary plugs associated with the stator to change the direction of impact of the fluid upon the rotor.

2. In the herein described variable speed transmission mechanism, the combination with a casing, a fluid propeller in one end of the casing, a stator in the other end of the casing, and a rotor adjacent the stator, of a series of radially arranged rotary elements journaled in the stator, each element having a slot passing diametrically therethrough, means to rotate all of the rotary elements simultaneously and to the same extent for the purpose of varying the direction and speed of rotation of the rotor, and means to control the passage of motive fluid to and from the fluid propeller.

3. In a transmission mechanism of the character set forth, the combination with a casing having a suction chamber at one end and a compression chamber at the other end, of a power shaft extending into the suction chamber, a fluid propeller rotated by the power shaft in said suction chamber, a stator in the compression chamber, a driven shaft, a rotor secured to the shaft and fitted snugly against one side of the stator and adapted to rotate freely around the axis of the driven shaft in either direction, a circular series of radially disposed rotary plugs fitted in the stator, each having a diametrically arranged slot for directing the pressure fluid from the compression chamber to and through the rotor, each of the plugs being provided at one end with a pinion, a gear ring fitted to the stator and adjustable around the axis of the driven shaft, hand controlled means for adjusting the ring to vary the effective position of the plugs, and means to control the passage of motive fluid to and from the suction chamber.

4. The herein described fluid transmission mechanism comprising, in combination, a casing having at one end a suction chamber and at the other end a compression chamber, a fluid pump in the suction chamber, means to operate the pump to cause it to force motive fluid directly therefrom into the compression chamber, a pair of spaced stators in the compression chamber, each stator having a series of adjustable plugs, each plug having a slot extending therethrough, a pair of rotors adjacent the respective stators and lying on opposite sides thereof, a ring coöperating with each series of plugs for adjusting all of the plugs of such series simultaneously, and means for adjusting both rings in the same direction simultaneously.

5. The herein described fluid transmission mechanism comprising a casing having in one portion a suction chamber and in another portion a compression chamber, a pump communicating with the suction chamber and serving to force motive fluid directly therefrom into the compression chamber, a pair of parallel disk-like stators arranged on opposite sides of the compression chamber, a disk-shaped rotor adjacent the outer face of each stator, a series of radially arranged plugs journaled in each stator, each plug having a diametrical passageway therethrough whereby the motive fluid is caused to pass from the compression chamber through the stator and impinge against the rotor, each plug also having secured thereto a pinion, a gear ring associated with each stator and adjustable around the axis thereof and meshing with all the pinions of the adjacent series of plugs, a controller shaft extending into the compression chamber at right angles to the axis of the stators and rotors, and means connected to the controller shaft to cause adjustment of both of the gear rings simultaneously and in the same direction.

6. In a device of the character set forth, the combination of a pair of spaced parallel disk-like stators arranged coaxially of each other, a pair of disk-shaped rotors adjacent the stators on opposite sides thereof, a series of radially arranged rotary plugs journaled in each stator, each plug having a pinion, a gear ring concentric of each stator and meshing on one side with all the pinions of one series of plugs and having on its other side a gear segment, a controller shaft journaled between the stators, means to rotate the controller shaft, and a pair of rocker arms secured to the controller shaft on opposite sides of the axis of the stators, each rocker arm having teeth meshing with one of said gear ring segments whereby a rotation of the controller shaft will cause rotation of both of the gear rings simultaneously and in the same direction.

In testimony whereof I have signed my name to this specification in the presence of two subscribing witnesses.

ARTHUR RICHARD BARRY,
*Administrator of the estate of Jacob Cloos, deceased.*

Witnesses:
EVELYN H. OTT,
ELEANORA M. NELSON.